Oct. 20, 1953　　　　J. A. BAINES　　　　2,655,820
POWER TRANSMISSION MECHANISM
Filed May 31, 1950　　　　　　　　　　　　3 Sheets-Sheet 1

Inventor
J. A. Baines

Oct. 20, 1953 J. A. BAINES 2,655,820
POWER TRANSMISSION MECHANISM
Filed May 31, 1950 3 Sheets-Sheet 2

Inventor
J. A. Baines

Oct. 20, 1953  J. A. BAINES  2,655,820
POWER TRANSMISSION MECHANISM
Filed May 31, 1950  3 Sheets-Sheet 3

Inventor
J. A. Baines

Patented Oct. 20, 1953

2,655,820

UNITED STATES PATENT OFFICE 2,655,820

POWER TRANSMISSION MECHANISM

John Archibald Baines, Acton, London, England, assignor to Rotax Limited, London, England Application May 31, 1950, Serial No. 165,244
In Great Britain June 3, 1949

1 Claim. (Cl. 74—785)

This invention relates to power transmission mechanisms of the kind commonly known as actuators, and comprising an electric motor, and an epicyclic speed reduction gearing, adapted to actuate through any appropriate intermediate mechanism, a flap, under carriage, wing, or other part of an aircraft or any other analogous purpose.

It is sometimes required to operate the same part by the simultaneous action of a plurality of actuators, but if any one of these should fail to operate, it may so obstruct the other or others as to impair or nullify their effectiveness, and the object of the present invention is to enable this contingency to be avoided in a simple and reliable manner.

Figure 1:
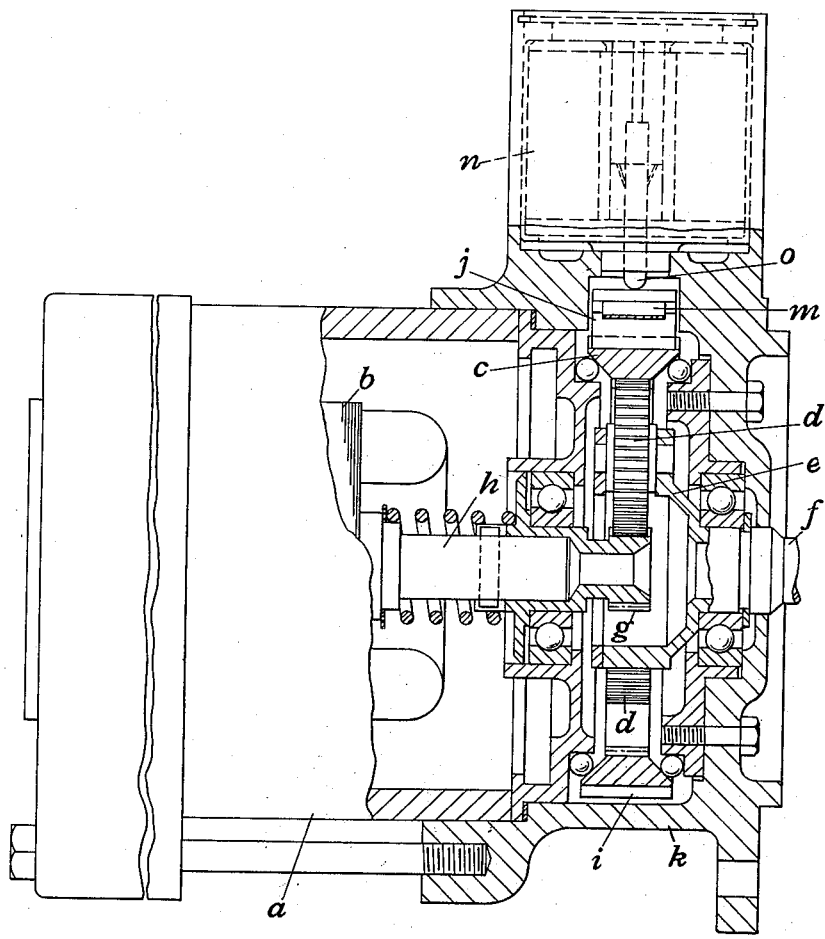
Figure 1 is a part sectional side elevation, and Figure 2 a cross section illustrating an embodiment of the invention.
Figure 2:
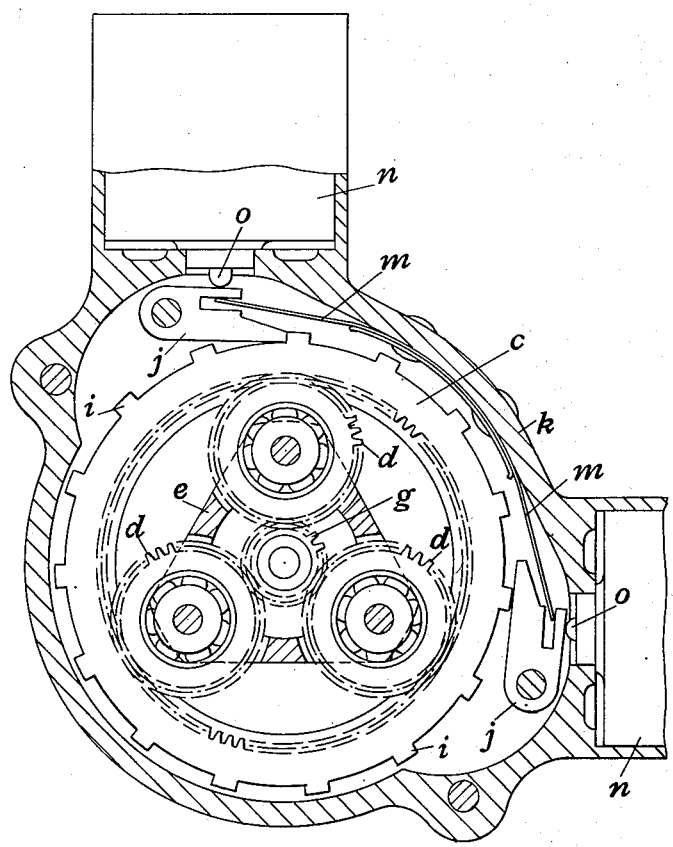

Referring to Figures 1 and 2 of the drawings, an electric motor $a$ has combined with its armature $b$ an epicyclic mechanism which includes a freely mounted internally toothed annulus $c$ which engages the planet pinions $d$ on a rotatable carrier $e$ connected to a driven shaft $f$, the sun pinion $g$ being formed on or secured to the armature shaft $h$. The driven shaft is connected to the part to be moved through any convenient intermediate mechanism which is common to two or more similar actuators.

Around the outer periphery of the annulus $c$ are formed teeth $i$ adapted to be engaged by a pair of pawls $j$ pivotally mounted in the gear housing $k$ and situated at any convenient angular distance apart. The pawls are held out of action by any convenient spring means, such as a blade spring or a pair of blade springs $m$ anchored at its or their centre to the housing and having its or their ends in engagement with the two pawls as shown in Figure 2.

In association with each pawl is arranged a solenoid $n$, the movable plunger $o$ of which is adapted to press the pawl into operative engagement with the annulus. Each solenoid is connected with a switch which controls both the motor and the solenoids as later described.

The arrangement is such that when the switch is closed for causing the motor to rotate in one direction, the corresponding solenoid causes the associated pawl to engage the annulus for holding the latter so that motion can be transmitted from the motor through the epicyclic gearing. Likewise, when the switch is closed for causing the motor to rotate in the opposite direction, the other pawl is brought into action. In either case, if through any accidental condition, motion is imparted from the driven shaft to the epicyclic mechanism, the operative pawl will allow the annulus to rotate idly.

Figure 3:
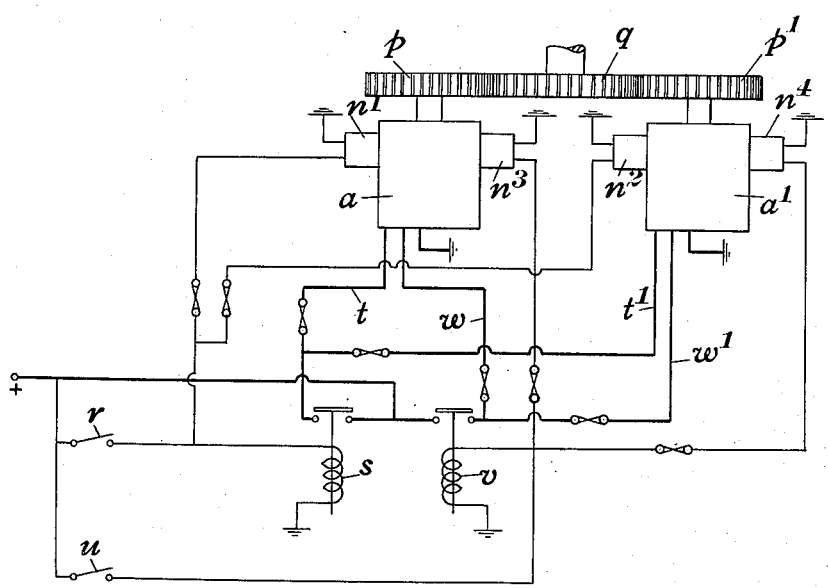
Figure 3 is a diagram of connections showing a power transmission mechanism arranged according to the invention.

When two or more actuators are employed to operate simultaneously on the same movable member, the appropriate pawl in each is rendered operative on setting the motors in motion, but should any one of the motors fail, it will not impede the other motor or motors, as its annulus will then revolve idly under the action of motion imparted to it from the driven shaft. Such an arrangement is shown diagrammatically in Figure 3 where two actuators $a$ and $a^1$ drive gears $p$ meshing with a single gear $q$ which is connected to the movable member in question. Operation of the actuators in the one direction is controlled by solenoids $n^1$, $n^2$, and in the other direction by solenoids $n^3$, $n^4$. Circuits for the solenoids $n^1$, $n^2$ are controlled by a switch $r$ which also controls the actuating coil $s$ of a contactor controlling circuits $t$ and $t^1$ for rotating the motors in one direction. Likewise circuits for the solenoids $n^3$ and $n^4$ are controlled by a switch $n$ which also controls the actuating coil $v$ of a second contactor controlling circuits $w$ and $w^1$ for rotating the motors in the opposite direction.

By this invention the satisfactory operation of a movable part by the simultaneous operation of a plurality of actuators is ensured in a simple and reliable manner.

Having thus described my invention what I claim as new and desire to secure by Letters Patent is:

A power transmission mechanism comprising, in combination, an electric motor, an epicyclic speed reduction gearing connected to the motor and including a freely mounted toothed annulus, a pawl engageable with the toothed annulus for preventing rotation thereof by the motor in one direction while permitting free rotation in the opposite direction, spring means for retracting said pawl clear of the toothed annulus, a second pawl independent of the first pawl and oppositely directed thereto for preventing rotation of the annulus in one direction while permitting free rotation thereof in the opposite direction, spring means for retracting said second pawl clear of the annulus, a pair of solenoids for respectively moving the pawls into engagement with the annulus, and means for alternatively energising said solenoids whereby when either pawl is engaged the annulus can rotate idly if motion is imparted to it from the driven side of the gearing.

JOHN ARCHIBALD BAINES.

References Cited in the file of this patent

UNITED STATES PATENTS

| Number | Name | Date |
| --- | --- | --- |
| 1,287,305 | Heinze | Dec. 10, 1918 |
| 1,330,790 | Dean | Feb. 17, 1920 |
| 1,670,313 | Oswald | May 12, 1928 |
| 2,086,030 | Hodgson | July 6, 1937 |